United States Patent [19]

Nagao et al.

[11] 3,864,349

[45] Feb. 4, 1975

[54] HYDRAZONIUM SALTS

[75] Inventors: Minoru Nagao, Ibaraki; Takashi Iwata, Kyoto; Hideo Yagi, Osaka; Saburo Tamura, Tokyo; Hisae Haruta, Ibaraki; Kazuo Nakanishi, Osaka, all of Japan

[73] Assignee: Fujisawa Pharmaceutical Co., Ltd., Osaka, Japan

[22] Filed: June 2, 1971

[21] Appl. No.: 149,352

[30] Foreign Application Priority Data
June 11, 1970 Japan.............................. 45-50920
July 25, 1970 Japan.............................. 45-65235

[52] U.S. Cl.... 260/293.65, 260/239 B, 260/326.85, 260/345.1, 260/347.7, 260/348 C, 260/464, 260/471 R, 260/534 R, 260/566 B, 71/88, 71/94, 71/95, 71/105, 71/106, 71/113, 71/121
[51] Int. Cl............................................. C07d 29/12
[58] Field of Search...... 260/566 B, 326.85, 293.65, 260/239 B

[56] References Cited
UNITED STATES PATENTS
3,455,983   7/1969   Kikles et al. ................ 260/566 B X

*Primary Examiner*—Bernard Helfin
*Assistant Examiner*—Gerald A. Schwartz
*Attorney, Agent, or Firm*—Oblon, Fisher, Spivak, McClelland & Maier

[57]   ABSTRACT

This invention relates to a plant growth regulating quaternary ammonium salt having the formula:

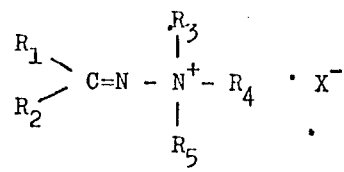

wherein $R_1$ is a hydrogen atom, lower alkyl or hydroxy-(lower)alkyl radical; $R_2$ is a substituted or unsubstituted alkenyl radical, cycloalkenyl, cycloalkenyl(lower)alkyl, substituted lower alkyl, higher alkyl radical or a heterocyclic group containing an oxygen atom; or $R_1$ and $R_2$ are both lower alkyl radicals which are linked together to form a cycloalkyl group; $R_3$ and $R_4$ are each lower alkyl radicals which may be linked together directly to form a heterocyclic group containing a nitrogen atom; $R_5$ is a lower alkyl radical; and X is a halogen atom, to methods of producing same and to compositions containing the same.

25 Claims, No Drawings

HYDRAZONIUM SALTS

FIELD OF THE INVENTION

This invention relates to a new hydrazonium salt, to a process for preparing the same and to a composition of the same which is useful for regulating plant growth.

SUMMARY OF THE INVENTION

Accordingly, the present invention provides, as a novel compound, a hydrazonium salt of the formula:

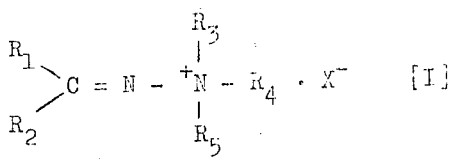

$$\begin{array}{c} R_1 \\ \phantom{R}\diagdown \\ \phantom{RR}C = N - \overset{+}{N} - R_4 \cdot X^- \qquad [I] \\ \phantom{R}\diagup \phantom{RRRRRR} | \\ R_2 \phantom{RRRRRRRR} R_5 \end{array}$$

wherein $R_1$ is a hydrogen atom, lower alkyl or hydroxy(lower)alkyl radical; $R_2$ is a substituted or unsubstitued alkenyl radical, cycloalkenyl, cycloalkenyl(lower)alkenyl, substituted lower alkyl, higher alkyl radical or a heterocyclic group containing an oxygen atom; or $R_1$ and $R_2$ are both lower alkyl radicals which are linked together to form a cycloalkyl group; $R_3$ and $R_4$ are each lower alkyl radical which may be linked together directly to form a heterocyclic group containing a nitrogen atom; $R_5$ is a lower alkyl radical; and X is a halogen atom.

DETAILED DESCRIPTION OF PREFERRED EMBODIMENTS

Illustrative of $R_1$, $R_3$, $R_4$ and $R_5$ when they represent a lower alkyl radical there may be mentioned, for example, a lower alkyl radical of not more than 6 carbon atoms, and preferably a lower alkyl radical of 1 to 4 carbon atoms, for example, methyl, ethyl, propyl, isopropyl, butyl, isobutyl or 1-methylpropyl radical.

Illustrative of $R_1$ when it represents a hydroxyl(lower)alkyl radical there may be mentioned, for example, a hydroxy(lower)alkyl radical of not more than 6 carbon atoms, for example, hydroxymethyl, 2-hydroxyethyl, 1-hydroxyethyl, 3-hydroxypropyl, 2-hydroxypropyl, 4-hydroxybutyl, 2-hydroxy-3-methylpropyl, 3-hydroxy-3-methylbutyl, 5-hydroxypentyl or 5-hydroxyhexyl radical.

Illustrative of $R_2$ when it represents an alkenyl radical there may be mentioned, for example, an alkenyl radical of not more than 12 carbon atoms, and preferably an alkenyl radical of 5 to 10 carbon atoms, for example, 4-pentenyl, 2-pentenyl, 5-hexenyl, 1,5-hexadienyl, 2,6-dimethyl-1,5-hexadienyl, 2,6-dimethyl-5-hexenyl, 8-nonenyl, 9-decenyl or 1-methyl-9-decenyl radical, which may bear one or more substituents such as a heterocyclic group containing an oxygen atom (e.g. furyl or pyranyl radical).

Illustrative of $R_2$ when it represents a cycloalkenyl radical there may be mentioned, for example, a cycloalkenyl radical of not more than 12 carbon atoms, and preferably a 5 to 7-membered cycloalkenyl radical of 5 to 10 carbon atoms, for example, 1-cyclopentenyl, 2-cyclopentenyl, 1,1-dimethyl-2-cyclopentenyl, 1-cyclohexenyl, 2-cyclohexenyl, 4-(1-methylvinyl)-1-cyclohexenyl, 4-(1-methylvinyl)-2-cyclohexenyl, 2,6,6-trimethyl-1-cyclohexenyl, 2,6,6-trimethyl-2-cyclohexenyl, 1-cycloheptenyl or 2-cycloheptenyl radical.

Illustrative of $R_2$ when it represents a cycloalkenyl(lower)alkenyl radical there may be mentioned, for example, a cycloalkenyl(lower)alkenyl radical of not more than 12 carbon atoms, and preferably a 5 to 7-membered cyloalkenyl(lower)alkenyl radical of 7 to 12 carbon atoms, for example, 2-(1-cyclopentenyl)vinyl, 2-(1-cyclohexenyl)vinyl, 2-(2-cyclohexenyl)vinyl, 2-(2,6,6-trimethyl-1-cyclohexenyl)vinyl, 2-(2,6,6-trimethyl-2-cyclohexenyl)vinyl, 2-[4-(1-methylvinyl)-1-cyclohexenyl]vinyl, 2-[4-(1-methylvinyl)-2-cyclohexenyl]vinyl, 2-(2,6,6-trimethyl-1,2-epoxycyclohexyl)vinyl, 3-(1-cyclohexenyl)-1-propenyl, 2-(1-cycloheptenyl)vinyl or 2-(2-cycloheptenyl)vinyl radical.

Illustrative of $R_2$ when it represents a substituted lower alkyl radical there may be mentioned, for example, a substituted lower alkyl radical having an alkyl moiety of not more than 6 carbon atoms, for example, methyl ethyl, propyl, isopropyl, 1-methylpropyl, butyl, isobutyl, pentyl or hexyl radical which is substituted with one or more of substituents such as a lower alkoxy (e.g. methoxy, ethoxy, propoxy, isopropoxy, butoxy or pentoxy), cyano, carboxyl, hydroxy or lower alkoxycarbonyl (e.g. methoxycarbonyl, ethoxycarbonyl, propoxycarbonyl, isopropoxycarbonyl, butoxycarbonyl or isobutoxycarbonyl) radical.

Illustrative of $R_2$ when it represents a higher alkyl radical there may be mentioned, for example, a higher alkyl radical of more than 6 carbon atoms, and more preferably a higher alkyl radical of 6 to 12 carbon atoms, for example, 1-ethylpentyl, heptyl, octyl, nonyl, decyl, undecyl, dodecyl or 1-methylundecyl radical.

Illustrative of $R_2$ when it represents a heterocyclic group containing an oxygen atom there may be mentioned, for example, an aromatic heterocyclic group containing an oxygen atom, and preferably a 5 to 7-membered aromatic heteromonocyclic group containing an oxygen atom, for example, furyl or pyranyl radical.

Illustrative of $R_1$ and $R_2$ when they represent lower alkyl radicals which are linked together to form a cycloalkyl group, i.e., a cycloalkyl or cycloalkenyl group there may be mentioned, for example, a saturated or unsaturated cycloalkyl group, and preferably a saturated or unsaturated 5 to 7-membered cycloalkyl group of not more than 10 carbon atoms, for example, cyclopentyl, 1-cyclopentenyl, 1-cyclohexenyl, cyclohexyl, 2-cyclohexenyl, 3,5,5-trimethyl-2-cyclohexenyl, cycloheptyl, 1-cycloheptenyl or 2-cycloheptenyl radical.

Illustrative of $R_3$ and $R_4$ when they represent lower alkyl radicals which are linked together directly to form a heterocyclic group containing a nitrogen atom there may be mentioned, for example, a saturated heterocyclic group containing a nitrogen atom, and preferably a 5 to 7-membered saturated heteromonocyclic group containing a nitrogen atom, for example, pyrrolidinyl, piperidino or homopiperidino radical.

The hydrazonium salt of the formula [I] is characterized by plant growth regulating activity, due to its anti-gibberellin and anti-auxin action in the plant.

Accordingly the compound [I] can be used as growth regulators to artificially control the growth of plants in agriculture and horiticulture, and may be useful in various applications typically illustrated as follows:

Use to prevent elongation in the height of plants such as Italian rye grass, orchard grass, sods, etc.;

to prevent lodging of rice plant, wheat, etc. by inhibiting elongation;

to dwarf in the height vegetables such as cucumber, tomato, egg-plant, soybean, peas, kidney bean, Spanish paprika, etc. and flowers such as cosmos, sage, chrysanthenum, cyclamene, poinsettia, stock, morning glory, etc.;

to prevent overgrowth of a pericarp of citrus fruits such as mandarin, orange, etc.;

to inhibit growth of a naught lateral branch of vegetables such as melon, water melon, cucumber, tomato, egg-plant, etc. and fruit trees such as pear, grape, apple, grapefruit, citrus fruits, etc.;

to prevent ear germination of cereals such as rice plant, wheat, etc.

to accelerate enlargement in the root of edible roots such as radish, yam, onion, sweet potato, potato, carrot, burdock, etc.;

to prevent bolting of vegetables such as cabbage, white rape, carrot, radish, spinach, burdock, etc.;

to alleviate frost damage, damage from a drought, damage from a salty wind or damage from a hotness, of fruits such as Japanese persimmon, grape, mulberry, etc. and vegetables such as green peas, spinach, letuce, etc.;

to accelerate ripeness of fruits such as mandarin, apple, peach, grape, tomato, cherry, strawberry, etc.;

to accelerate female flower bud formation of cucumber, water melon, melon, pumpkin, etc.;

to induce flower-bud formation of flowers such as morning glory, cosmos, salvia, potmum, etc. and fruits such as apple, peach, grape, persimmon, etc.;

The compound [I] may be further expected to be useful in various applications as follows:

Use to prevent head cracking of globose vegetables such as cabbage, etc.;

to prevent cracking of fruits such as grape, cherry, apple, etc.;

to prevent overripening of water melon, melon, etc.;

to prevent sprouting of plants such as potato, sweet potato, yam, onion, chestnuts, etc. during storage thereof;

to prevent generation and growth of auxiliary buds of tobacco plant, particularly after pinching of terminal bud;

to improve storageability of cereals such as rice, wheat, corn, etc., fruits such as apple, chestnuts, vegetables such as onion, yam, potato, sweet potato, etc., and other seeds or crops.

to prevent malformation of egg-plants caused by side effect of some agricultural chemicals; to accelerate vernalization, as control of a flower-bud formation, of plants such as grape, mandarin, apple, peach, barley, rye, wheat, etc.;

to prevent dropping of fruits such as apple, mandarin, peach, pear, etc.

According to the present invention, the hydrazonium salt of the formula:

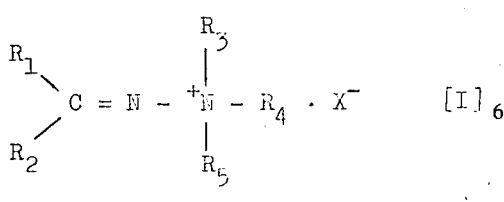

wherein $R_1$ is a hydrogen atom, lower alkyl or hydroxy(lower)alkyl radical; $R_2$ is a substituted or unsubstituted alkenyl radical, cycloalkenyl, cycloalkenyl(lower)alkenyl, substituted lower alkyl, higher alkyl radical or a heterocyclic group containing an oxygen atom; or $R_1$ and $R_2$ are both lower alkyl radicals which are linked together to form a cycloalkyl group; $R_3$ and $R_4$ are each lower alkyl radical which may be linked together directly to form a heterocyclic group containing a nitrogen atom; $R_5$ is a lower alkyl radical; and X is a halogen atom, is prepared by reacting a hydrazone of the formula:

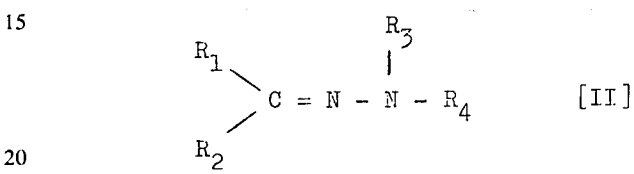

wherein $R_1$, $R_2$, $R_3$ and $R_4$ are each as defined above, with a compound of the formula:

$$R_5 - X \quad [III]$$

wherein $R_5$ and X are each as defined above.

The hydrazone of the formula [II] to be used in this reaction is partly known, e.g. N,N-dimethyl-3,7-dimethyl-6-octenylhydrazone and N,N-dimethyl-2-ethylhexylhydrazone [Chemical Abstracts, volume 54, column 10814h]; N,N-dimethyloctylhydrazone and N,N-dimethylnonylhydrazone [Chemical Abstracts, volume 51, column 14717a], etc. and the other hydrazones can be prepared according to a manner similar to the said journals.

The reaction for preparing a compound of the formula [I] is ordinarily carried out in the absence of a solvent, but, if necessary, it may be also carried out in an inert solvent. Examples of the said solvents are methanol, ethanol, ether, benzene, etc. In case that the present reaction is carried out in the presence of a metallic halide such as sodium chloride, potassium chloride, sodium bromide, potassium bromide, sodium iodide, potassium iodide, etc., a hydrazonium salt of the formula [I] having an acid residue of the metallic halide, i.e. halogen instead of an acid residue of a compound [III] may be obtained, provided that the acid residue of the metallic halide is more active in its rreactivity than that of the acid residue of a compound [III]. In case of the present reaction being carried out in the presence of sodium iodide, potassium iodide and the like, such compounds may promote the present reaction. There is no as to the reaction temperature.

Now the plant growth regulating activity of typical compounds which fall within the category of the compound of the formula [I] of this invention will be illustrated by reference to various tests in which the individual active ingredients are the following numbered compounds.

Compound N. 1

2-[1-Methyl-3-(2,6,6-trimethyl-1-cyclohexenyl)-2-propenylidene]-1,1,1-trimethylhydrazonium iodide

Compound No. 2

2-[1-Methyl-3-(2,6,6-trimethyl-1,2-epoxycyclohexyl)-2-propenylidene]-1,1,1-trimethylhydrazonium iodide

Compound No. 3

2-[1-Methyl-3-(2,6,6-trimethyl-2-cyclohexenyl)-2-propenylidene]-1,1,1-trimethylhydrazonium iodide

Compound No. 4

2-[1-Methyl-3-(2-furyl)-2-propenylidene]-1,1,1-trimethylhydrazonium iodide

Compound No. 5

2-[1-Methyl-3-[4-(1-methylvinyl)-1-cyclohexenyl]-2-propenylidene]-1,1,1-trimethylhydrazonium iodide

Compound No. 6

2-[4-(1-Methylvinyl)-1-cyclohexenyl]methylidene-1,1,1-trimethylhydrazonium iodide

Compound No. 7

2-(2-Butenylidene)-1,1,1-trimethylhydrazonium iodide

Compound No. 8

2-Dodecanylidene-1,1,1-trimethylhydrazonium iodide

Compound No. 9

2-(3,7-Dimethyl-2,6-octadienylidene)-1,1,1-trimethylhydrazonium iodide

Compound No. 10

2-(3-Cyanopropylidene)-1,1,1-trimethylhydrazonium iodide

Compound No. 11

2-(3-Methoxycarbonylpropylidene)-1,1,1-trimethylhydrazonium iodide

Compound No. 12

2-(2-Methoxyethylidene)-1,1,1-trimethylhydrazonium iodide

Compound No. 13

2-Octylidene-1,1,1-trimethylhydrazonium iodide

Compound No. 14

2-Nonylidene-1,1,1-trimethylhydrazonium iodide

Compound No. 15

2-Decanylidene-1,1,1-trimethylhydrazonium iodide

Compound No. 16

2-Undecanylidene-1,1,1-trimethylhydrazonium iodide

Compound No. 17

2-(11-Dodecenylidene)-1,1,1-trimethylhydrazonium iodide

Compound No. 18

1-[4-(1-Methylvinyl)-1-cyclohexenyl]methylideneamine-1-methylpyrrolidinium iodide

Compound No. 19

1-[1-Methyl-3-(2,6,6,-trimethyl-1-cyclohexenyl)-2-propenylidene]amino-1-methylpyrrolidinium iodide

Compound No. 20

1-[1-Methyl-3-(2,6,6-trimethyl-2-cyclohexenyl)-2-propenylidne]amino-1-methylpyrrolidinium iodide

Compound No. 21

2-(2-Furylmethylidene)-1,1,1-trimethylhydrazonium iodide

Compound No. 22

2-(2-Ethylhexylidene)-1,1,1-trimethylhydrazonium iodide

Test 1.

One ml. of an acetone solution of the compound at varying concentrations was placed in Petri dish of 4.5 cm. in diameter, in which a filter paper and absorbent cotton have been placed, and allowed to stand overnight to remove acetone. Then, 5 ml. of a Hoagland's nutrient solution mentioned below with one-half concentrations was added to the content of the Petri dish. Seven seeds of rice (Oryze sativa L., c.v. "Koshijiwase" or "Kotaketamanishiki", germinated by immersion in water at 30°C. for 72 hours) were placed in each Petri dish and then grown at 30°C. for 1 week during which artificial light was radiated for 14 hours per day, while dark condition was employed for the remaining 10 hours per day. Measurement of second leaf sheaths was made to determine an elongation ratio. The result is set forth in the following tables in which the elongation ration (%) was expressed as a relative value when the elongation of control plants in the non-treatment area was rated as 100.

| Oryza sativa L., c.v. "Koshijiwase" | | | | | |
|---|---|---|---|---|---|
| | Concentration (ppm) | | | | |
| Compound No. | 1 | 10 | 50 | 100 | 200 |
| 1 | 79.4 | 78.3 | 73.5 | 67.5 | 55.5 |
| 3 | 83.6 | 82.5 | 77.3 | 70.8 | 57.8 |
| 6 | 59.1 | 59.7 | 52.3 | 45.3 | 31.3 |
| 9 | 92.4 | 89.6 | 77.2 | 61.7 | 30.7 |
| 12 | — | — | 92.6 | 89.1 | — |
| 13 | 84.3 | 82.3 | 83.5 | 62.5 | 40.5 |
| 14 | 92.5 | 89.9 | 78.3 | 63.8 | 34.8 |
| 16 | 78.4 | 76.2 | 66.2 | 53.7 | 28.7 |
| 20 | — | — | 60.8 | 53.3 | — |
| c.c.c. | 100.8 | 100.4 | 98.8 | 96.8 | 92.8 |

[Note: In the above table, c.c.c. refers to trimethyl-(2-chloroethyl)ammonium chloride which has been reported in Annals of Applied Biology, volume 63, page 211 – 223.]

| Oryza sativa L., c.v. "Kotaketamanishiki" | | | | | | |
|---|---|---|---|---|---|---|
| | Concentration (ppm) | | | | | |
| Compound No. | 12.5 | 25 | 50 | 100 | 250 | 500 |
| 1 | 80.8 | 78.5 | 74.3 | 65.8 | 40.3 | — |
| 3 | 90.2 | 88.3 | 84.8 | 77.8 | 56.8 | 21.8 |
| 6 | 67.6 | 60.3 | 46.3 | 18.3 | — | — |
| 8 | 66.0 | 64.4 | 61.4 | 55.4 | 37.4 | 7.4 |
| 9 | 55.4 | 54.1 | 55.6 | 46.6 | 31.6 | 6.6 |
| 18 | — | — | 50.7 | 18.7 | — | — |
| 19 | — | — | 62.3 | 49.0 | — | — |

The formulation of the Hoagland's nutrient solution used is as follows:

| | | |
|---|---|---|
| Calcium nitrate tetrahydrate | 1.180 | g/l |
| Magnesium sulfate heptahydrate | 0.493 | do. |
| Potassium nitrate | 0.506 | do. |
| Potassium dihydrogen phosphate | 0.136 | do. |
| Ferric ethylenediaminetetraacetate | 0.010 | do. |

Test 2.

A seedling-bed consisting of sand was sown with rice (*Oryza sativa* L., c.v. "Kinmaze") which was about to germinate by dipping them in 30°C water which was kept in dark place for 48 hours. The bed was kept in a dark place at 30°C. Immediately before growth of the third leaf, the leaf sheath was cut off 2 cm. below the lamina joint of the 2nd leaf and was used as the test material. Thereafter, this material was immediately placed in distilled water and was allowed to stand for 24 hours. Then, the leaf sheaths which formed 35° of angle with the leaf blade were selected for use in this test.

a. 20 ml. each of an aqueous solution of the compounds at varying concentrations was placed in Petri dishes, each 7 cm. in diameter and 2.5 cm. in depth, wherein 20 test materials were each placed and allowed to stand for 48 hours. Thereafter, the angle of leaf sheath formed with leaf blade was measured. In this test each value was expressed in terms of the rate of angle formed in an aqueous solution of each compound to that formed in distilled water alone. The test value obtained in distilled water alone was regarded as 100.

| | Concentration (ppm) | | | |
|---|---|---|---|---|
| Compound No. | 1 | 10 | 100 | 200 |
| 1 | 75.3 | 73.5 | 54.6 | — |
| 8 | 77.8 | 76.2 | 50.0 | 42.0 |
| 9 | 82.9 | 81.8 | 70.1 | 57.1 |
| 18 | 96.2 | 93.8 | 69.5 | — |
| 19 | 81.2 | 80.8 | 68.3 | — | b. An aqueous solution of each compound at varying concentrations plus indazoleacetic acid, 10 ppm, was prepared and tested in the same fashion as described in (a). Each test value was expressed in terms of the rate of angle formed in an aqueous solution of each compound at varying concentrations plus indazoleacetic acid, 10 ppm, to that formed in an aqueous solution of indazoleacetic acid 10 ppm. The test value obtained in an aqueous solution of indazoleacetic acid 10 ppm alone was taken as 100.

| | Concentration (ppm) | | | |
|---|---|---|---|---|
| Compound No. | 1 | 10 | 100 | 200 |
| 1 | 89.1 | 87.2 | 68.3 | 47.3 |
| 8 | 92.8 | 90.0 | 62.1 | 31.1 |
| 9 | 93.3 | 91.7 | 75.5 | 57.5 |

Test 3.

A vat, in which sbsorbent cotton containing water was placed and further a filter paper of 5.5 cm. in diameter was placed thereon, was sown with each 12 seeds of wheat (*Triticum sativum* L., c.v. "Manitoba No. 2" or "Norin No. 61"). The vat was kept for 2 days at 25°C. The filter paper bearing seedlings of wheat obtained as above was placed in Petri dish of 6 cm. in diameter in which 10 ml. of a Hoagland's nutrient solution with one-half concentrations containing each compound at varying concentrations was placed. The Petri dish was kept in a growth box for 5 days and thereafter the whole length of wheat was measured. The test value obtained in the Hoagland's nutrient solution alone was regarded as 100.

| | *Triticum sativum* L., c.v. "Manitoba No. 2" | | | | | |
|---|---|---|---|---|---|---|
| | Concentration (ppm) | | | | | |
| Compound No. | 12.5 | 25 | 50 | 100 | 250 | 500 |
| 1 | 45.1 | 44.2 | 42.4 | 38.9 | 28.4 | 15.9 |
| 3 | 81.3 | 79.7 | 76.7 | 70.7 | 52.7 | 22.7 |
| 6 | 41.1 | 41.2 | 39.4 | 35.9 | 25.4 | 7.9 |
| 8 | 51.1 | 50.2 | 48.4 | 44.9 | 34.4 | 16.9 |
| 9 | 59.5 | 58.5 | 56.5 | 52.5 | 40.5 | 20.5 |
| 15 | 56.2 | 55.6 | 54.3 | 52.0 | 44.3 | 31.8 |
| 16 | 41.1 | 41.2 | 39.4 | 35.9 | 25.4 | 7.9 |

| | *Triticum sativum* L., c.v. "Norin No. 61" | | | | | |
|---|---|---|---|---|---|---|
| | Concentration (ppm) | | | | | |
| Compound No. | 12.5 | 25 | 50 | 100 | 250 | 500 |
| 1 | 53.4 | 52.1 | 49.6 | 44.6 | 29.6 | 4.6 |
| 3 | 71.8 | 70.4 | 67.7 | 62.2 | 45.7 | 18.2 |
| 6 | 47.9 | 46.8 | 44.5 | 40.0 | 26.5 | 4.0 |
| 8 | 75.0 | 73.8 | 71.5 | 67.0 | 43.6 | 31.0 |
| 9 | 68.7 | 67.0 | 63.8 | 57.3 | 37.8 | 9.8 |
| 15 | 55.1 | 54.2 | 52.4 | 48.9 | 38.4 | 20.9 |
| 16 | 50.1 | 49.2 | 47.4 | 43.9 | 33.4 | 15.9 |

Test 4.

Seedlings of pea (*Pisum sativum*) which were slightly germinated in vermiculite were dipped in distilled water for 24 hours. Thereafter, 10 ml. of a Hoagland's nutrient solution with one-half concentrations containing each compound at varying concentrations was placed in Petri dish of 10 cm. in diameter, wherein roots of the seedlings of pea were dipped for 5 days. Thereafter, length of the first internode was measured. The test value obtained in the Hoagland's nutrient solution alone was regarded as 100.

| | Concentration (ppm) | | | | | |
|---|---|---|---|---|---|---|
| Compound No. | 12.5 | 25 | 50 | 100 | 250 | 500 |
| 1 | 66.3 | 65.9 | 65.2 | 63.7 | 59.2 | 51.7 |
| 3 | 72.8 | 71.4 | 68.2 | 63.2 | 46.7 | 19.2 |
| 6 | 86.1 | 85.2 | 83.4 | 79.9 | 69.4 | 51.9 |

Test 5.

Five ml. of an aqueous solution of each compound at varying concentrations was placed in Petri dish of 9 cm. in diameter. The Petri dish was sown with seven seeds of cucumber (*Cucumis sativus*) and kept at 30°C for 48 hours. Thereafter, the Petri dish was further kept at 24 ± 1°C for 10 days receiving 300-lux light continuously. Length of a hypocotyl of cucumber was measured. The test value obtained in water alone was regarded as 100.

| | Concentration (ppm) | | | | |
|---|---|---|---|---|---|
| Compound No. | 1 | 10 | 50 | 100 | 200 |
| 1 | 60.9 | 63.8 | 50.2 | 33.2 | — |

-Continued

| Compound No. | Concentration (ppm) | | | | |
|---|---|---|---|---|---|
| | 1 | 10 | 50 | 100 | 200 |
| 3 | 51.0 | 48.7 | 38.2 | 25.3 | — |
| D | 86.1 | 84.1 | 75.3 | 64.3 | 42.3 |
| 5 | 77.7 | 75.1 | 63.5 | 49.0 | 20.0 |
| 6 | 78.6 | 75.4 | 61.4 | 43.9 | 8.9 |
| 7 | 85.7 | 84.7 | 84.3 | 74.8 | 63.8 |
| 8 | 78.7 | 76.0 | 64.0 | 49.0 | 19.0 |
| 9 | 74.7 | 72.7 | 63.9 | 52.9 | 30.9 |
| 10 | 87.1 | 82.7 | 58.2 | 28.7 | — |
| 11 | 85.5 | 81.2 | 62.0 | 38.0 | — |
| 12 | 91.4 | 88.1 | 73.1 | 54.8 | 17.8 |
| 14 | 118.1 | 102.2 | 85.8 | 52.8 | — |
| 16 | 120.6 | 115.5 | 92.6 | 64.2 | 6.9 |
| 17 | 64.3 | 54.8 | 12.4 | — | — |
| 18 | 80.6 | 88.9 | 80.6 | 80.6 | — |
| 19 | 74.7 | 74.5 | 73.7 | 72.7 | — |

Test 6.

Five ml. of an aqueous solution of each compound at varying concentrations was placed in Petri dish of 9 cm. in diameter. The Petri dish was sown with seven seeds of tomato (*Lycopersicon esculentum* Mill) and kept at 30°C ± 1°C for 10 days receiving 300-lux light continuously. Length of a hypocotyl of tomato was measured. The test value obtained in water alone was regarded as 100.

| Compound No. | Concentration (ppm) | | | | |
|---|---|---|---|---|---|
| | 1 | 10 | 50 | 100 | 200 |
| 1 | 54.4 | — | 27.2 | — | — |
| 2 | 96.2 | — | 60.6 | 41.1 | 2.1 |
| 3 | 104.9 | 96.7 | 60.1 | 14.0 | — |
| 4 | 97.0 | 94.3 | 82.0 | 66.7 | — |
| 5 | 99.9 | 93.5 | 65.1 | 29.5 | — |
| 6 | 96.3 | 91.4 | 69.7 | 42.6 | — |
| 7 | 80.5 | 79.3 | 73.2 | 66.6 | — |
| 8 | 96.1 | 91.0 | 68.5 | 40.4 | — |
| 9 | 86.8 | 81.5 | 58.3 | 29.3 | — |
| 11 | 97.8 | 95.1 | 83.1 | 68.2 | — |
| 12 | 75.6 | 73.7 | 65.7 | 55.6 | — |
| 13 | 90.2 | 86.2 | 68.5 | 46.4 | — |
| 14 | 80.5 | 77.5 | 64.5 | 48.1 | — |
| 15 | 93.9 | 89.7 | 71.2 | 48.1 | — |
| 16 | 81.3 | 77.0 | 57.8 | 33.8 | — |
| 21 | 93.2 | 91.4 | 83.3 | 73.3 | — |
| 22 | 97.9 | 94.8 | 81.2 | 64.3 | — |

Test 7.

An aqueous solution of each compound at varying concentrations was sparyed to one of 1 m. current year shoot in length of an apple tree at the end of May. The items in the following table were observed.

| Compound No. | Concentration (ppm) | A (%) | B (%) |
|---|---|---|---|
| 1 | 1000 | 107.0 | 255 |
| | 500 | 137.0 | 247 |
| | 100 | 110.5 | 256 |
| 6 | 1000 | 103.5 | 239 |
| | 500 | 136.4 | 291 |
| | 100 | 122.8 | 279 |
| Control | 0 | 162.0 | 264 |

Note:
1) In the above table, "A" refers to "the elongation ratio (%) of current year shoot" which is calculated according to the following formula:
A (%) = The length of the current year shoot at the time of the elongation stopping/The length of the current year shoot at the time of spray of the test solution × 100
In this test, the measurement was conducted 99 days after the spray of the test solution.
2) In the table, "B" refers to "growth ratio of fruit" which is calculated according to the following formula:
B (%) = Diameter of fruit 113 days after spray/Diameter of fruit at the time of the spray of the test solution × 100

Practical and presently-preferred embodiments for the preparation of the present invention are illustratively shown in the following non-limitative examples.

EXAMPLE 1.

A mixture of 4-(1-methylvinyl)-1-cyclohexenecarboxyaldehyde (7.5 g) and 1,1-dimethylhydrazine (4.0 g) was allowed to stand over night at room temperature. To the resulting mixture (the starting compound of the present invention) was added benzene and the benzene solution was dried over sodium sulfate. The benzene distilled off, and to the resulting solution was added methyl iodide (10 g) and the solution was allowed to stand over night. Precipitates were collected by filtration to give crystals (9.0 g) of 2-[4-(1-methylvinyl)-1-cyclohexenyl]methylidene-1,1,1-trimethylhydrazonium iodide, m.p. 162°–163°C (decomp.).

The following compounds were prepared according to a manner similar to the preceding Example 1.

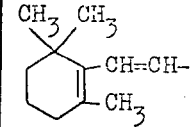

—Continued

| | $R_1$ $R_2$ $\!\!\!\!\!\!\!\!\!\!\!\!\!$ C = N - $\overset{+}{N}$(CH$_3$)$_3$   I$^-$ | | |
|---|---|---|---|
| No. | $R_2$ | $R_1$ | Physico-chemical property |
| 3 | CH$_3$ CH$_3$ ⟨cyclohexane with O, CH$_3$⟩-CH=CH- | CH$_3$ | I.R. spectrum: 1630, 1595, 1230, 975, 950 cm$^{-1}$ |
| 4 | CH$_3$ CH$_3$ ⟨cyclohexene with CH$_3$⟩-CH=CH- | CH$_3$ | m.p. 173-175°C |
| 5 | CH$_3$ ⟨cyclohexene with =CH$_2$⟩-CH=CH- | CH$_3$ | m.p. 150-152°C |
| 6 | CH$_3$(CH$_2$)$_9$CH- | H | m.p. 119-122°C |
| 7 | CH$_3$ CH$_3$ ⟨alkene⟩-CH$_3$ | H | m.p. 120-122°C |
| 8 | NCCH$_2$CH$_2$- | H | m.p. 95-96°C |
| 9 | CH$_3$OCOCH$_2$CH$_2$- | H | m.p. 108-108.5°C |
| 10 | ⟨furan⟩- | H | m.p. > 250°C |
| 11 | CH$_3$(CH$_2$)$_7$CH- | H | m.p. 116-118°C |
| 12 | CH$_3$(CH$_2$)$_8$CH- | H | m.p. 115-116°C |
| 13 | CH$_2$=CH(CH$_2$)$_7$CH- | H | m.p. 107-109°C |
| 14 | CH$_3$ CH$_3$ ⟨alkene with CH$_3$⟩ | H | m.p. 75-76°C |
| 15 | CH$_3$OCH$_2$- | H | m.p. 166-167°C |
| 16 | HOOCCH$_2$CH$_2$- | CH$_3$ | Yellowish viscous material |
| 17 | CH$_3$ $\underset{CH_3}{\overset{|}{C}}$-CH$_2$- OH | CH$_3$ $\underset{CH_3}{\overset{|}{C}}$-CH$_2$- OH | Yellowish viscous material |

—Continued
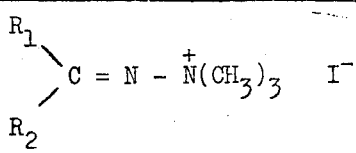
| No. | $R_2$ | $R_1$ | Physico-chemical property |
|---|---|---|---|
| 18 | $(CH_3)_2C=CH-$ | $CH_3$ | Powder |
| 19 | cyclohexylidene | | Brown powder |
| 20* | 2,6,6-trimethylcyclohex-1-enyl-CH=CH- | $-CH_2CH_3$ | Yellowish powder |
| 21 | (2-furyl)-CH=CH- | $CH_3$ | m.p. 145–147°C |
| 22 | $CH_3(CH_2)_5CH-$ | H | m.p. 108–110°C |
| 23 | $CH_3(CH_2)_6CH-$ | H | m.p. 112–114°C |
| 24 | $CH_3(CH_2)_9CH-$ | $CH_3$ | m.p. 66–68°C |
| 25 | $CH_3(CH_2)_3CH(C_2H_5)-$ | H | m.p. 157°C |
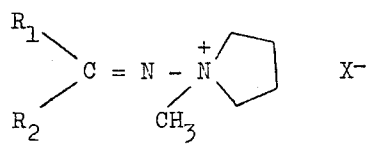
| No. | $R_1$ | $R_2$ | X | Physico-chemical property |
|---|---|---|---|---|
| 26 | 2,6,6-trimethylcyclohex-1-enyl-CH=CH- | $CH_3$ | I | m.p. 123–125°C |

—Continued

| | $\begin{array}{c} R_1 \\ R_2 \end{array} C = N - \overset{+}{\underset{CH_3}{N}}\!\!\bigcirc \quad X^-$ | | | |
|---|---|---|---|---|
| No. | $R_1$ | $R_2$ | X | Physico-chemical property |
| 27 | (4-isopropenyl-cyclohex-1-enyl with CH₃, CH₂) | H | I | m.p. 109-110°C |
| 28 | (6,6-dimethyl-2-methylcyclohex-2-enyl)-CH=CH- | CH₃ | I | Oily material |
| 29 | (2,6,6-trimethylcyclohex-1-enyl) | H | I | Oily material |
| 30 | (4,4-dimethyl-2-methyl-6-methylenecyclohex-1-enyl) | | I | Oily material |
| 31 | (4-isopropenylcyclohex-1-enyl) | H | Cl | Oily material |

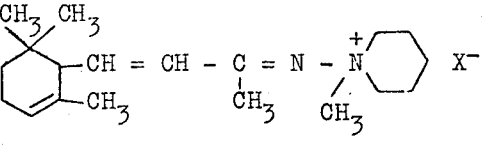

| No. | X | Pysico-chemical property |
|---|---|---|
| 32 | Cl | Oily material |
| 33 | I | Oily material |

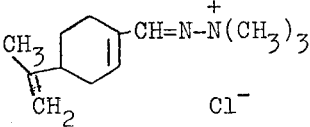

| 34 | (4-isopropenylcyclohex-1-enyl)-CH=N⁺-N(CH₃)₃ Cl⁻ | m.p. 154-156°C |

[Note: The formula: 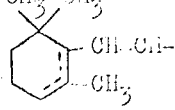

listed in No. 20 indicates the mixture of the groups consisting of the formulae: 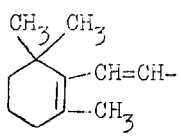 and 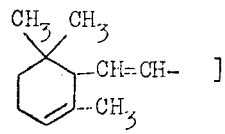 ]

The hydrazonium salt [I] of the present invention is rarely applied directly onto plants, but is used in the form of compositions comprising at least one of the quaternary ammonium salt of the formula [I] in association with a carrier, or a surface-active agent, or both a carrier and a surface-active agent. The effectiveness of the compound of the present invention, when the compounds is used as plant growth regulator, will depend on the concentration applied. A of effective concentrations of the hydrazonium salt [I] as plant growth regulators will be observed depending not only on the type, organ or texture of the plants treated, but also on the physiological age of the plants. Thus, the concentration to be employed should be determined depending upon the intended use of the agent, the type of plants to be treated and the period of application. Usually the effective concentration, however, will be within the range of 1–5000 ppm and preferably of 10–500 ppm, and although these are not critical.

The composition of the invention may contain other ingredients, for examples, protective colloids such as gelatin, glue, casein, gums and polyvinyl alcohol; sodium; cellulose ethers, stabilizers such as ethylene diamine tetraacetic acid; other herbicides or pesticides; and stickers, for example, non-volatile oils.

The composition of the invention can be used in any conventionally known manner. The most suitable method of use, however, should be selected depending upon the object of use, the type of plants to be treated and the period of application. Illustrative methods of application of the composition are spraying or dusting of the composition to the surfaces of leaves or/and leafstalks of plants, treatment of soil on which plants grow with the composition, spraying of the composition onto seeds, fruits, tubers, etc., soaking of seeds, fruits, tubers, etc., into the composition.

The compositions of the invention may be formulated as wettable powders, dusts, granules, solution, emulsifiable concentrates, emulsions and pasters.

Solid preparations can be prepared with inert powders to the compound [I]. The preparations thus can be homogeneous powders that either can be used as such, diluted with inert solids to form dusts, or suspended in a suitable liquid medium for spray application. The powders usually comprise the active ingredient admixed with suitable amounts of conditioning agents. Natural clays, either absorptive such as attapulgite or relatively non-absorptive such as china clays, diatomaceous earth, synthetic fine silica, calcium silicate and other inert solid carriers can be used. The active ingredient usually makes up from about 1 to about 80 percent by weight, preferably from about 1 to about 50 percent by weight, of these powder preparations. For conversion of the powders to dusts, talc, pyrophyllite, volcanic ash and other dense, lactose, sodium chloride, rapid-setting inert solids customarily are used.

Liquid preparations including the active ingredient can be prepared by admixing the same with a suitable liquid medium. The active ingredient can be either in solution or in suspension in the liquid medium. Typical of the liquid media commonly employed are water, kerosene, Stoddard solvent, xylene, alcohols, alkylated naphthalene, glycols and ketones such as diisobutylketone, cyclohexanone, etc. The active ingredient usually makes up from about 1 to about 80 percent by weight, preferably from about 1 to about 50 percent by weight, of these liquid preparations. Some of these preparations are designed to be used as such, and others to be extended with large quantities of water.

Preparations in the form of wettable powders or liquids can also include one or more surface active agents such as wetting, spreading, dispersing or emulsifying agent. Thus mixtures of the above liquids with the active ingredient can contain an emulsifying agent to make an emulsificable oil preparation. The surface active agents cause the liquid or dry compositions to disperse or emulsify easily in water to give aqueous sprays. The surface active agents employed can be of the anionic, cationic and / or non-ionic type.

EXAMPLES FOR PREPARATION OF COMPOSITION

Practical and preferred embodiments of the compositions are illustrated in the following Examples wherein parts are by weight.

| Example 1 | |
| --- | --- |
| 2-[1-Methyl-3-(2,6,6-trimethyl-1-cyclohexenyl)-2-propenylidene]-1,1,1-trimethylhydrazonium iodide | 95 parts |
| Polyoxyethylenealkylallylether | 5 parts |

The above mixture is diluted with water to a desired concentration when it is used.

| Example 2 | |
| --- | --- |
| 2-[1-Methyl-3-(2,6,6-trimethyl-2-cyclohexenyl)-2-propenylidene]-1,1,1-trimethylhydrazonium iodide | 10 parts |
| Tween 20 (Trade name) | 1 part |
| Ethanol | 89 parts |

The above mixture is diluted with water to a desired concentration when it is used.

| Example 3 | |
| --- | --- |
| 2-[4-(1-Methylvinyl)-1-cyclohexenyl]methylidene-1,1,1-trimethylhydrazonium iodide | 20 parts |
| Sodium ligninsulfonate | 2 parts |
| Polyoxyethylenealkylallylether | 2 parts |
| Clay | 76 parts |

The above mixture is suspended in water in order to get a desired concentration when it is used.

---

Example 4
2-(3,7-Dimethyl-2,6-octadienylidene)-1,1,1-
trimethylhydrazonium iodide    20 parts
Polyoxyethylenealkylallylether   10 parts
Toluene                          70 parts

---

The above mixture is emulsified in water in order to get a desired concentration when it is used.

---

Example 5
2-Nonylidene-1,1,1-trimethylhydrazonium iodide    2 parts
Talc                                              98 parts

---

The above mixture is admixed with carrier when it is used.

---

Example 6
2-[1-Methyl-3-(2,6,6-trimethyl-1-cyclohexenyl)-2-
propenylidene]-1,1,1-trimethylhydrazonium iodide   10 parts
Sodium sulfate (or sodium chloride)                90 parts

---

The above mixture is prepared into tablets.

---

Example 7
2-[1-Methyl-3-(2,6,6-trimethyl-1-cyclohexenyl)-2-
propenylidene]-1,1,1-trimethylhydrazonium iodide   10 parts
Lactose                                            90 parts

---

The above mixture is prepared into tablets.

What is claimed is:

1. A hydrazonium salt of the formula

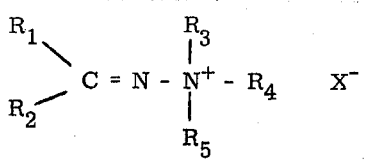

wherein $R_1$ is a hydrogen atom or a lower alkyl radical; $R_2$ is a 5 to 7-membered cycloalkenyl radical of from 5 to 10 carbon atoms, a 5 to 10-membered cycloalkenyl-(lower)alkenyl radical of 7 to 12 carbon atoms, or $R_1$ and $R_2$ are both lower alkyl radicals which are linked together to form a 5 to 7-membered cycloalkyl or cycloalkenyl group of not more than 10 carbon atoms; $R_3$ and $R_4$ are each a lower alkyl radical which may be linked directly together to form a 5 to 7-membered saturated heteromonocyclic group containing a nitrogen atom; $R_5$ is a lower alkyl radical and X is a halogen atom.

2. A hydrazonium salt of the formula:

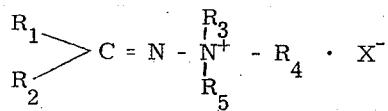

wherein $R_1$ is a lower alkyl radical, $R_2$ is a cycloalkenyl(lower)-alkenyl radical; $R_3$, $R_4$ and $R_5$ are each a lower alkyl radical; and X is a halogen atom.

3. The compound according to claim 2 which is 2-[1-Methyl-3-(2,6,6-trimethyl-1-cyclohexenyl)-2-propenylidene]-1,1,1-trimethylhydrazonium iodide.

4. The compound according to claim 1 in which $R_1$ is a hydrogen atom; $R_2$ is a cycloalkenyl radical; $R_3$, $R_4$ and $R_5$ are each lower alkyl radical; and X is a halogen atom.

5. The compound according to claim 2 which is 2-[4-(1-Methylvinyl)-1-cyclohexenyl]methyl-idene-1,1,1-trimethylhydrazonium iodide.

6. The compound of claim 2, wherein $R_2$ is a cycloalkenyl (lower)alkenyl radical selected from the group consisting of 2-(1-cyclopentenyl)vinyl, 2-(1-cyclohexenyl)vinyl, 2-(2-cyclohexenyl)vinyl, 2-(2,6,6-trimethyl-1-cyclohexenyl)vinyl, 2-(2,6,6-trimethyl-2-cyclohexenyl)vinyl, 2-[4-(1-methylvinyl)-1-cyclohexenyl]-vinyl, 2-[4-(1-methylvinyl)-2-cyclohexenyl]vinyl, 2-(2,6,6-trimethyl-1,2-epoxycyclohexyl)vinyl, 3-(1-cyclohexenyl)-1-propenyl, 2-(1-cycloheptenyl)vinyl and 2-(2-cycloheptenyl)vinyl.

7. The compound of claim 2, which is 2-[1-methyl-3-(2,6,6-trimethyl-2-cyclohexenyl)-2-propenylidene]-1,1,1-trimethylhydrazonium iodide.

8. The compound of claim 2 which is 2-[1-methyl-3-[4-(1-methylvinyl)-1-cyclohexenyl]-2-propenylidene]-1,1,1-trimethylhydrazonium iodide.

9. The compound according to claim 1 in which $R_1$ is a hydrogen atom; $R_2$ is a cycloalkenyl radical; $R_3$ and $R_4$ are each a lower alkyl radical which may be linked together directly to form a heterocyclic group containing a nitrogen atom; $R_5$ is a lower alkyl radical; and X is a halogen atom.

10. The compound according to claim 1 in which $R_1$ is a lower alkyl radical; $R_2$ is a cycloalkenyl-(lower)alkenyl radical; $R_3$ and $R_4$ are each a lower alkyl radical which may be linked together directly to form a heterocyclic group containing a nitrogen atom; $R_5$ is a lower alkyl radical; and X is a halogen atom.

11. The compound according to claim 1 in which $R_1$ and $R_2$ are both lower alkyl radicals which are linked together to form a cycloalkyl group; $R_3$, $R_4$ and $R_5$ are each a lower alkyl radical; and X is a halogen atom.

12. The compound according to claim 9 in which $R_1$ is a hydrogen atom; $R_2$ is 4-(1-methylvinyl)-1-cyclohexenyl; $R_3$, $R_4$ and $R_5$ are each methyl; and X is an iodine atom.

13. The compound according to claim 9 in which $R_1$ is a hydrogen atom; $R_2$ is 4-(1-methylvinyl)-1-cyclohexenyl; $R_3$ and $R_4$ are linked together to form a pyrrolidine ring; $R_5$ is methyl; and X is an iodine atom.

14. The compound according to claim 9 in which $R_1$ is a hydrogen atom; $R_2$ is 4-(1-methylvinyl)-1-cyclohexenyl; $R_3$ and $R_4$ are linked together to form a pyrrolidine ring; $R_5$ is methyl; and X is a chlorine atom.

15. The compound according to claim 9 in which $R_1$ is a hydrogen atom; $R_2$ is 4-(1-methylvinyl)-1-cyclohexenyl; $R_3$, $R_4$ and $R_5$ are each methyl; and X is a chlorine atom.

16. The compound according to claim 10 in which $R_1$ is methyl; $R_2$ is 2-(2,6,6-trimethyl-1-cyclohexenyl)vinyl; $R_3$, $R_4$ and $R_5$ are each methyl; X is an iodine atom.

17. The compound according to claim 10 in which $R_1$ is methyl; $R_2$ is 2-(2,6,6-trimethyl-2-cyclohexenyl)vinyl; $R_3$, $R_4$ and $R_5$ are each methyl; X is an iodine atom.

18. The compound according to claim 10 in which $R_1$ is methyl; $R_2$ is 2-[4-(1-methylvinyl)-1-cyclohexenyl]vinyl; $R_3$, $R_4$ and $R_5$ are each methyl; and 19. The compound according to claim 10 in which $R_1$ is methyl; $R_2$ is 2-(2,6,6-trimethyl-1-cyclohexenyl)vinyl; $R_3$ and $R_4$ are linked together to form a pyrrolidine ring; $R_5$ is a methyl; and X is an iodine atom.

20. The compound according to claim 10 in which $R_1$ is methyl; $R_2$ is 2-(2,6,6-trimethyl-2-cyclohexenyl)vinyl; $R_3$ and $R_4$ are linked together to form a pyrrolidine ring; $R_5$ is a methyl; and X is an iodine atom.

21. The compound according to claim 10 in which $R_1$ is ethyl; $R_2$ is 2-(2,6,6-trimethyl-1-cyclohexenyl)vinyl; $R_3$, $R_4$ and $R_5$ are each methyl; and X is an iodine atom.

22. The compound according to claim 10 in which $R_1$ is ethyl; $R_2$ is 2-(2,6,6-trimethyl-2-cyclohexenyl)vinyl; $R_3$, $R_4$ and $R_5$ are each methyl; and X is an iodine atom.

23. The compound according to claim 10 in which $R_1$ is methyl; $R_2$ is 2-(2,6,6-trimethyl-2-cyclohexenyl)vinyl; $R_3$ and $R_4$ are linked together to form a piperidine ring; $R_5$ is methyl; and X is a chlorine atom.

24. The compound according to claim 10 in which $R_1$ is methyl; $R_2$ is 2-(2,6,6-trimethyl-2-cyclohexenyl)vinyl; $R_3$ and $R_4$ are linked together to form a piperidine ring; $R_5$ is methyl; and X is an iodine atom.

25. The compound according to claim 11 in which $R_1$ and $R_2$ are linked together to form a cyclohexyl ring; $R_3$, $R_4$ and $R_5$ are each methyl; and X is an iodine atom.

* * * * *

UNITED STATES PATENT AND TRADEMARK OFFICE
CERTIFICATE OF CORRECTION

PATENT NO. : 3,864,349
DATED : February 4, 1975
INVENTOR(S) : MINORU NAGAO ET AL It is certified that error appears in the above-identified patent and that said Letters Patent are hereby corrected as shown below:

Column 4, line 52, correct the spelling of "reactivity".
line 57, after "no" insert --limitation--.

Column 5, line 66, change "methylideneamine-1-" to --methylideneamino-1- --.

Column 6, line 8, change "propenylidne" to --propenylidene--;
lines 33 and 34, change "ration" to --ratio--.
In the Table, lines 40-50, under Concentration 50, for Compound No. 13, change "83.5" to --73.5--.

Column 9, the first table, after "Compound No. 3, the next Compound No. should be "4" instead of "p".

Column 17, line 9 after the Table, delete "A" and insert --Considerable ranges--.
line 23 after the Table, after "dium" insert --polyphosphates--.

Column 18, line 18 after the Table, correct the spelling of "emulsifiable".

Signed and Sealed this

Third Day of August 1976

[SEAL]

Attest:

RUTH C. MASON
*Attesting Officer*

C. MARSHALL DANN
*Commissioner of Patents and Trademarks*